United States Patent
Tomari et al.

(10) Patent No.: US 9,141,018 B2
(45) Date of Patent: Sep. 22, 2015

(54) CHARGING MEMBER, CHARGING DEVICE, PROCESS CARTRIDGE, IMAGE FORMING APPARATUS, AND METHOD OF MANUFACTURING CHARGING MEMBER

(71) Applicant: FUJI XEROX CO., LTD., Tokyo (JP)

(72) Inventors: Shogo Tomari, Kanagawa (JP); Hiroyuki Miura, Kanagawa (JP)

(73) Assignee: FUJI XEROX CO., LTD., Tokyo (JP)

( * ) Notice: Subject to any disclaimer, the term of this patent is extended or adjusted under 35 U.S.C. 154(b) by 0 days.

(21) Appl. No.: 14/278,984

(22) Filed: May 15, 2014

(65) Prior Publication Data

US 2015/0177636 A1    Jun. 25, 2015

(30) Foreign Application Priority Data

Dec. 19, 2013 (JP) ................. 2013-262917

(51) Int. Cl.
| | |
|---|---|
| G03G 15/02 | (2006.01) |
| B32B 25/14 | (2006.01) |
| B32B 7/12 | (2006.01) |
| B32B 37/12 | (2006.01) |

(52) U.S. Cl.
CPC ............ *G03G 15/0233* (2013.01); *B32B 7/12* (2013.01); *B32B 25/14* (2013.01); *B32B 37/1284* (2013.01); *B32B 2250/03* (2013.01); *B32B 2307/202* (2013.01)

(58) Field of Classification Search
CPC ...... G03G 15/0233; B32B 25/14; B32B 7/12; B32B 37/1284
USPC .......................................... 399/176
See application file for complete search history.

(56) References Cited

U.S. PATENT DOCUMENTS

| | | | | |
|---|---|---|---|---|
| 4,911,983 | A * | 3/1990 | Otani et al. ................. | 428/408 |
| 7,374,527 | B2 * | 5/2008 | Minagoshi .................... | 492/30 |
| 8,550,969 | B2 * | 10/2013 | Taniguchi et al. ............. | 492/56 |
| 2003/0096917 | A1 * | 5/2003 | Hattori et al. ................. | 525/403 |
| 2004/0135129 | A1 * | 7/2004 | Hattori et al. ................. | 252/510 |
| 2008/0107451 | A1 * | 5/2008 | Nukada et al. ................ | 399/176 |
| 2012/0202663 | A1 * | 8/2012 | Mizumoto et al. ............ | 492/18 |

FOREIGN PATENT DOCUMENTS

| | | |
|---|---|---|
| JP | 2006-208447 | 8/2006 |
| JP | 2007-108319 | 4/2007 |

* cited by examiner

*Primary Examiner* — Francis Gray
(74) *Attorney, Agent, or Firm* — Oliff PLC (57) ABSTRACT

A charging member includes a conductive support, a conductive adhesive layer that is arranged on the conductive support and contains a crosslinking agent having two or more functional groups reacting with a halogen group and a resin having a halogen group, and an elastic layer that is arranged so as to contact with the conductive adhesive layer and contains a rubber material having a halogen group, wherein the resin having a halogen group in the conductive adhesive layer and the rubber material having a halogen group in the elastic layer are cross-linked by reaction with the crosslinking agent at least at an interface between the conductive adhesive layer and the elastic layer.

10 Claims, 6 Drawing Sheets

CHARGING MEMBER, CHARGING DEVICE, PROCESS CARTRIDGE, IMAGE FORMING APPARATUS, AND METHOD OF MANUFACTURING CHARGING MEMBER

CROSS-REFERENCE TO RELATED APPLICATIONS

This application is based on and claims priority under 35 USC 119 from Japanese Patent Application No. 2013-262917 filed Dec. 19, 2013.

BACKGROUND

1. Technical Field

The present invention relates to a charging member, a charging device, a process cartridge, an image forming apparatus, and a method of manufacturing a charging member.

2. Related Art

In an image forming apparatus employing an electrophotographic system, first, charges are formed on the surface of an image holding member, which is formed of a photoconductive photoreceptor including an inorganic or organic material, by using a charging device, an electrostatic latent image is formed thereon by laser light obtained by modulating an image signal, and then, the electrostatic latent image is developed with charged toner to form a visualized toner image. Then, the toner image is electrostatically transferred to a recording medium such as a recording sheet via an intermediate transfer member or directly and is fixed to the recording medium, and thus, a desired reproduced image may be obtained.

Further, as the charging device which charges the surface of the image holding member, a charging member is suitably used.

SUMMARY

According to an aspect of the invention, there is provided a charging member including:

a conductive support;

a conductive adhesive layer that is arranged on the conductive support and contains a crosslinking agent having two or more functional groups reacting with a halogen group and a resin having a halogen group; and an elastic layer that is arranged so as to contact with the conductive adhesive layer and contains a rubber material having a halogen group, wherein the resin having a halogen group in the conductive adhesive layer and the rubber material having a halogen group in the elastic layer are cross-linked by reaction with the crosslinking agent at least at an interface between the conductive adhesive layer and the elastic layer.

BRIEF DESCRIPTION OF THE DRAWINGS

Exemplary embodiments of the present invention will be described in detail based on the following figures, wherein.

DETAILED DESCRIPTION

Hereinafter, exemplary embodiments of the invention will be described in detail.

Charging Member

A charging member according to an exemplary embodiment includes a conductive support (hereinafter, also simply referred to as a "support"), a conductive adhesive layer arranged on the conductive support (hereinafter, also simply referred to as an "adhesive layer"), and an elastic layer arranged to contact with the conductive adhesive layer. The conductive adhesive layer contains a crosslinking agent having two or more functional groups reacting with a halogen group and a resin having a halogen group, and the elastic layer contains a rubber material having a halogen group. In addition, the resin having a halogen group that is contained in the conductive adhesive layer and the rubber material having a halogen group that is contained in the elastic layer are cross-linked by reaction with the crosslinking agent at least at the interface between the conductive adhesive layer and the elastic layer.

In addition, in the following description, the crosslinking agent having two or more functional groups reacting with a halogen group is also simply referred to as a "halogen group crosslinking agent," the resin having a halogen group is also simply referred to as a "halogen group resin," and the rubber material having a halogen group is also simply referred to as a "halogen group rubber material."

The charging member may be obtained by forming the elastic layer by coating the support on which the adhesive layer is formed with the elastic layer, and then, performing operation such as vulcanization. However, the elastic layer shrinks due to the residual stress of the elastic layer at the time of formation and adhesion is deteriorated at the interface between the elastic layer and the adhesive layer due to the difference in rigidity between the elastic layer and the adhesive layer in some cases. Further, under the usage condition, the elastic layer contracts or expands by variations in cross-linkage, and adhesion is deteriorated at the interface between the elastic layer and the adhesive layer in some cases. As a result, the deterioration in adhesion causes a phenomenon that the elastic layer is peeled off from the support, and image unevenness arises in some cases.

Contrarily, according to the charging member of the exemplary embodiment, the peeling of the elastic layer is prevented at the interface between the elastic layer and the adhesive layer and the occurrence of image unevenness caused by the peeling of the elastic layer is reduced.

Further, although the mechanism is not necessarily clear, it is observed that adhesion is improved by crosslinking the halogen group resin in the adhesive layer and the halogen group rubber material in the elastic layer with the halogen group crosslinking agent at the interface between the elastic layer and the adhesive layer, and peeling of the elastic layer is prevented at the interface between the elastic layer and the adhesive layer.

In addition, it is considered that the adhesion between the elastic layer and the adhesive layer is also improved by containing the halogen group crosslinking agent in the elastic layer. However, since heat is applied to an elastic layer forming material in the process of kneading the material and in the process of forming the elastic layer, the crosslinking reaction of the halogen group rubber material in the elastic layer forming material with the halogen group crosslinking agent easily occurs by the heat and processability is deteriorated. Thus, it is difficult to obtain a desired shape.

On the other hand, an adhesive for forming the adhesive layer is not required to be heated even in the process of adding and mixing the halogen group crosslinking agent into the adhesive, and the above-described deterioration of processability is not caused and the adhesive layer may be formed into a desired shape. In addition, the elastic layer is further formed on the adhesive layer that is formed when heating is not performed at a temperature at which the crosslinking reaction by the halogen group crosslinking agent may occur, and then, heating is performed at a temperature at which the crosslinking reaction of the elastic layer and the adhesive layer with the halogen group crosslinking agent may occur. Thus, the crosslinking reaction by the halogen group crosslinking agent occurs more effectively at the interface between the elastic layer and the adhesive layer. Therefore, higher adhesive properties may be obtained.

Hereinafter, the configuration of the charging member will be described in detail.

Figure 1:
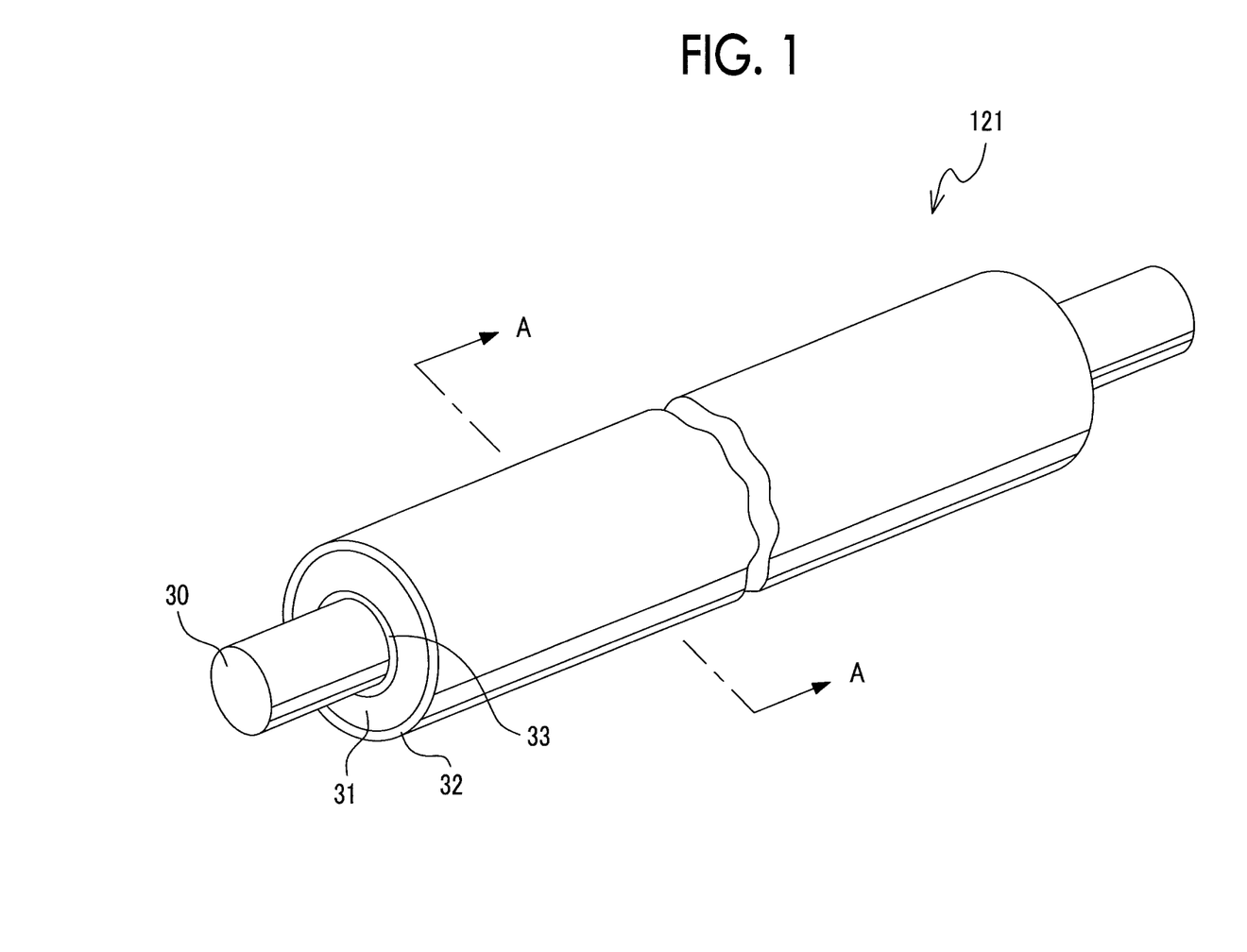
FIG. 1 is a perspective view schematically illustrating a charging member according to an exemplary embodiment.
Figure 2:
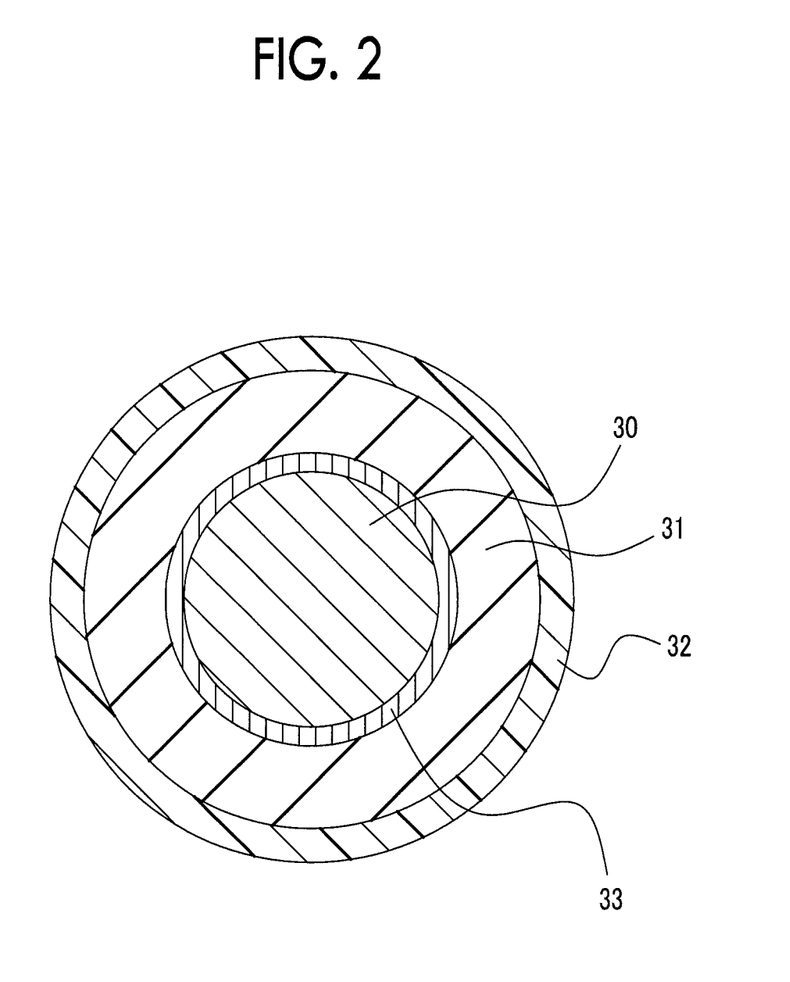
FIG. 2 is a sectional view schematically illustrating the charging member according to the exemplary embodiment.

FIG. 1 is a perspective view schematically illustrating an example of the charging member according to the exemplary embodiment. FIG. 2 is a sectional view schematically illustrating the charging member shown in FIG. 1, and FIG. 2 is a sectional view taken along the line A-A of FIG. 1.

As shown in FIGS. 1 and 2, the charging member 121 according to the exemplary embodiment is, for example, a roll member including a cylindrical conductive support 30 (shaft), a conductive adhesive layer 33 arranged on the outer peripheral surface of the conductive support 30, and an elastic layer 31 arranged to contact with the outer peripheral surface of the conductive adhesive layer 33. In addition, a conductive outermost layer 32 arranged on the outer peripheral surface of the elastic layer 31 may be provided.

Further, the configuration of the charging member 121 according to the exemplary embodiment is not limited to the above configuration and may have a configuration including, for example, a resistance adjusting layer or a transition preventing layer arranged between the elastic layer 31 and the conductive outermost layer 32, and a coating layer (protective layer) arranged on the outer surface (the outermost surface) of the conductive outermost layer 32.

The term of "conductivity" in this specification means that the volume resistivity at 20° C. is less than $1 \times 10^{13}$ Ωcm.

Conductive Support

The conductive support 30 will be described.

The conductive support 30 in the exemplary embodiment is a cylindrical member having metal on the surface.

The conductive support 30 is formed of, for example, metal or alloy such as aluminum, copper alloy, and stainless steel, iron plated with chromium, nickel, or the like, and a conductive material such as a conductive resin.

The conductive support 30 functions as an electrode and a support member of the charging member, and examples of the material of the conductive support include metal such as iron (such as free-cutting steel), copper, brass, stainless steel, aluminum, and nickel. In the exemplary embodiment, the conductive support 30 is a rod-like conductive member and as the conductive support 30, members (such as resin or ceramic members) having the outer peripheral surface plated or members (such as resin or ceramic members) in which a conductive material is dispersed may be used. The conductive support 30 may be a hollow member (tubular member) or a non-hollow member.

Conductive Adhesive Layer

The conductive adhesive layer 33 is a layer for bonding the elastic layer 31 and the conductive support 30 to each other and includes a resin having a halogen group (a halogen group resin) and a crosslinking agent having two or more functional groups reacting with a halogen group (a halogen group crosslinking agent). In addition, the crosslinking reaction of the halogen group resin with the functional groups in the halogen group crosslinking agent occurs at the interface between the adhesive layer 33 and the elastic layer 31.

Crosslinking Agent Having Two or More Functional Groups Reacting with Halogen Group (Halogen Group Crosslinking Agent)

Examples of the halogen group crosslinking agent include a polyamine-based crosslinking agent, a thiourea-based crosslinking agent, a thiadiazole-based crosslinking agent, a triazine-based crosslinking agent, a pyrazine-based crosslinking agent, a quinoxaline-based crosslinking agent, and a bisphenol-based crosslinking agent.

Examples of the polyamine-based crosslinking agent include ethylenediamine, hexamethylenediamine, diethylenetriamine, triethylenetetramine, hexamethylenetetramine, p-phenylenediamine, cumenediamine, N,N'-dicinnamylidene-1,6-hexanediamine, ethylenediamine carbamate, and hexamethylenediamine carbamate.

Examples of the thiourea-based crosslinking agent include ethylenethiourea, 1,3-diethylthiourea, 1,3-dibutylthiourea, and trimethylthiourea.

Examples of the thiadiazole-based crosslinking agent include 2,5-dimercapto-1,3,4-thiadiazole and 2-mercapto-1,3,4-thiadiazole-5-thiobenzoate.

Examples of the triazine-based crosslinking agent include 2,4,6-trimercapto-1,3,5-triazine, 2-methoxy-4,6-dimercaptotriazine, 2-hexylamino-4,6-dimercaptotriazine, 2-diethylamino-4,6-dimercaptotriazine, 2-cyclohexyl amino-4,6-dimercaptotriazine, 2-dibutylamino-4,6-dimercaptotriazine, 2-anilino-4,6-dimercaptotriazine, and 2-phenyl amino-4,6-dimercaptotriazine.

Examples of the pyrazine-based crosslinking agent include 2,3-dimercaptopyrazine derivatives. Examples of 2,3-dimercaptopyrazine derivatives include pyrazine-2,3-dithiocarbonate, 5-methyl-2,3-dimercaptopyrazine, 5-ethylpyrazine-2,3-dithiocarbonate, 5,6-dimethyl-2,3-dimercaptopyrazine, and 5,6-dimethylpyrazine-2,3-dithiocarbonate.

Examples of the quinoxaline-based crosslinking agent include 2,3-dimercaptoquinoxaline derivatives. Examples of 2,3-dimercaptoquinoxaline derivatives include quinoxaline-2,3-dithiocarbonate, 6-methylquinoxaline-2,3-dithiocarbonate, 6-ethyl-2,3-dimercaptoquinoxaline, 6-isopropylquinoxaline-2,3-dithiocarbonate, and 5,8-dimethylquinoxaline-2,3-dithiocarbonate.

Example of the bisphenol-based crosslinking agent include 4,4'-dihydroxydiphenylsulfoxide, 4,4'-dihydroxydiphenylsulfone (bisphenol S), 1,1-cyclohexylidene-bis(4-hydroxybenzene), 2-chloro-1,4-cyclohexylene-bis(4-hydroxybenzene), 2,2-isopropylidene-bis(4-hydroxybenzene) (bisphenol A), hexafluoroisopropylidene-bis(4-hydroxybenzene) (bisphenol AF), and 2-fluoro-1,4-phenylene-bis(4-hydroxybenzene).

Among these, a triazine compound, a quinoxaline compound, and a thiourea compound are preferable.

Further, the halogen group crosslinking agent may be used alone or in combination of two or more types.

The amount of the halogen group crosslinking agent added to the adhesive layer forming material is preferably from 0.005 part by weight to 15 parts by weight, more preferably from 0.01 part by weight to 10 parts by weight, and still more preferably from 0.05 part by weight to 10 parts by weight with respect to 100 parts by weight of the halogen group resin.

Adhesive: Resin Having Halogen Group

For the conductive adhesive layer 33, a resin having a halogen group (halogen group resin) is used as an adhesive from the viewpoint of improving adhesive properties and adhesiveness maintaining properties between the elastic layer and the conductive adhesive layer.

Examples of the halogen group include F, Cl, Br, I, and At and among these, a resin containing Cl, F, or Br atom is preferably used. A resin containing a chlorine atom is more preferably used.

As the resin containing a halogen group, for example, halogenated polypropylene polymers; halogenated polyethylene polymers; chlorosulfonated polyethylene; polychloroprene; halogenated polyolefins such as chlorinated polybutadiene, chlorinated ethylene propylene copolymers, chlorinated butadiene styrene copolymers, and chlorinated polyvinyl chloride; and polyolefin-based resins obtained by graft-modifying the above compounds using unsaturated carboxylic acids such as acrylic acid, methacrylic acid, maleic acid, and itaconic acid, or acid anhydrides such as maleic anhydride and itaconic anhydride; fluororesin; chlorinated butyl; and brominated butyl may be used. These may be used alone or as a mixture of two or more types.

In addition, the form thereof includes a solvent type, a latex type, a hot melt type, a film type, and the like, but a solvent type or a hot melt type is preferable for the reasons of simplification and easiness of a working process, and the like.

Examples of the halogenated polypropylene polymers include chlorinated polypropylene polymers, fluorinated polypropylene polymers, and brominated polypropylene polymers.

Examples of the halogenated polyethylene polymers include chlorinated polyethylene polymers, fluorinated polyethylene polymers, and brominated polyethylene polymers.

Among these, chlorosulfonated polyethylene, polychloroprene, halogenated polyolefin, fluororesin, chlorinated butyl, and brominated butyl are more preferable from the viewpoint of adhesive properties.

In addition, the above resin having a halogen group may be used alone or in combination of two or more types.

The amount of the resin having a halogen group contained in the conductive adhesive layer is preferably from 10 parts by weight to 100 parts by weight, and more preferably from 50 parts by weight to 100 parts by weight with respect to a total 100 parts by weight of the conductive adhesive layer from the viewpoint of improving adhesive properties and adhesiveness maintaining properties between the elastic layer and the conductive adhesive layer.

Other Adhesives

In addition, other adhesives may be used together with the resin having a halogen group in the conductive adhesive layer 33. The adhesives to be used together may be composed of, for example, resins or rubber materials. Examples of the resins include acrylic resins such as polyurethane, polymethyl methacrylate or polybutyl methacrylate, polyvinyl butyral, polyvinyl acetal, polyarylate, polycarbonate, polyester, phenoxy resin, polyvinyl acetate, polyamide, polyvinyl pyridine, and cellulosic resin. Further, as the rubber materials, rubbers such as EPDM, polybutadiene, natural rubber, polyisoprene, styrene-butadiene rubber (SBR), chloroprene rubber (CR), nitrile-butadiene rubber (NBR), silicone rubber, urethane rubber, and epichlorophydrin rubber, and resin materials such as polybutadiene resin (RB), polystyrene-based elastomers such as styrene-butadiene-styrene elastomers (SBS), polyolefine-based elastomers, polyester-based elastomers, polyurethane, polyethylene (PE), polypropylene (PP), polyvinyl chloride (PVC), acrylic resin, styrene-vinyl acetate copolymers, butadiene-acrylonitrile copolymers, ethylene-vinyl acetate copolymers, ethylene-ethylacrylate copolymers, ethylene-methacrylic acid (EMAA) copolymers, and materials obtained by modifying the above resins may be used.

However, when other adhesives are used together with the resin having a halogen group as the adhesive, the ratio of the resin having a halogen group to the total adhesive is preferably 20% by weight or more, more preferably, 50% by weight or more, and still more preferably 100% by weight.

Conductive Material

The conductive adhesive layer 33 may contain a conductive material to make the conductive adhesive layer conductive.

Examples of the conductive material include conductive powders of carbon black such as ketjen black and acetylene black; pyrolytic carbon, graphite; various conductive metals or alloys such as aluminum, copper, nickel, and stainless steel; various conductive metal oxides such as tin oxide, indium oxide, titanium dioxide, tin oxide-antimony oxide solid solution, and tin oxide-indium oxide solid solution; and insulating materials of which the surface is processed to be conductive.

The average particle size of the conductive material is preferably from 0.01 μm to 5 μm, more preferably from 0.01 μm to 3 μm, and still more preferably from 0.01 μm to 2 μm from the viewpoint of controlling the conductivity of the conductive adhesive layer 33 to be within the above-described range.

The average particle size is calculated by observing a sample obtained by cutting from the conductive adhesive layer with an electron microscope, measuring the diameters (the maximum diameters) of 100 conductive material particles, and averaging the measured diameters.

The amount of the conductive material to be added to the conductive adhesive layer is preferably from 0.1 part by weight to 6 parts by weight, more preferably from 0.5 part by weight to 6 parts by weight, and still more preferably from 1 part by weight to 3 parts by weight with respect to a total weight of 100 parts by weight of the conductive adhesive layer, from the viewpoint of controlling the conductivity of the conductive adhesive layer 33 to be within the above-described range.

Other Components

The conductive adhesive layer may further contain a catalyst, a curing accelerator, an inorganic filler, an organic or polymeric filler, a flame retardant, antistatic agent, a conductivity providing agent, a lubricant, a slidability providing agent, a surfactant, a colorant, an acid acceptor, and the like, in addition to the above-described crosslinking agent, adhesive, and conductive material. The conductive adhesive layer may include two or more types thereof.

Examples of the acid acceptor include metal compounds and hydrotalcites. Examples of the metal compounds used as the acid acceptor include oxide, hydroxide, carbonate, carboxylate, silicate, borate, or phosphite of an element in Group II (alkaline earth metal) of the periodic table; and oxide, basic carbonate, basic carboxylate, basic phosphites, or tribasic sulfate of an element in Group IV of the periodic table. Specifically, examples of the metal compounds include magnesium oxide, magnesium hydroxide, barium hydroxide, magnesium carbonate, barium carbonate, calcium oxide, calcium hydroxide, calcium carbonate, calcium silicate, calcium stearate, zinc stearate, calcium phthalate, calcium phosphite, zinc white, tin oxide, tin stearate and basic tin phosphite.

The corrosion of the conductive support which occurs by the acid component in the elastic layer is prevented by containing the acid acceptor in the adhesive layer, and further, adhesion may be improved.

Examples of the accelerator include 1,8-diazabicyclo(5,4,0)undec-7-ene (hereinafter, simply referred to as "DBU") salts and 1,5-diazabicyclo(4,3,0)non-5-ene (hereinafter, simply referred to as "DBN") salts. Examples of the DBU salts include DBU-carbonate, DBU-stearate, DBU-2-ethylhexanoate, DBU-benzoate, DBU-salicylate, DBU-3-hydroxy-2-naphthoate, DBU-phenolic resin salts, DBU-2-mercaptobenzothiazole salts, and DBU-2-mercaptobenzimidazole salts. Examples of the DEN salts include DBN-carbonate, DBN-stearate, DBN-2-ethylhexanoate, DBN-benzoate, DBN-salicylate, DBN-3-hydroxy-2-naphthoate, DEN-phenolic resin salts, DEN-2-mercaptobenzothiazole salts, and DEN-2-mercaptobenzimidazole salts.

Formation of Conductive Adhesive Layer

The conductive adhesive layer may be formed by applying a composition such as a crosslinking agent or an adhesive that is dissolved in a medium such as a solvent, onto the conductive support 30.

In addition, when the conductive adhesive layer is formed, it is preferable that the composition be applied at a temperature at which the crosslinking reaction by the halogen group crosslinking agent does not occur to form an adhesive layer. An elastic layer is further formed on the adhesive layer that is formed when heating is not performed at a temperature at which the crosslinking reaction by the halogen group crosslinking agent may occur, and heating is performed at a temperature at which the crosslinking reaction of the elastic layer and the adhesive layer with the halogen group crosslinking agent may occur. Thus, the crosslinking reaction by the halogen group crosslinking agent occurs more effectively at the interface between the elastic layer and the adhesive layer, and adhesive properties may be further improved.

Examples of the solvents include normal organic solvents such as methanol, ethanol, n-propanol, n-butanol, benzylalcohol, methyl cellosolve, ethyl cellosolve, acetone, methyl ethyl ketone, cyclohexanone, methyl acetate, n-butyl acetate, dioxane, tetrahydrofuran, methylene chloride, chloroform, chlorobenzene, and toluene. The solvents may be used alone or used in mixture of two or more types.

The thickness of the conductive adhesive layer is not particularly limited and the thickness is preferably from 1 to 100 and more preferably from 5 µm to 50 µm.

Elastic Layer

The elastic layer 31 will be described.

The elastic layer 31 includes, for example, a rubber material having a halogen group (halogen group rubber material) as an elastic material, a conductive material, and if necessary, other additives. Then, the elastic layer 31 is a layer formed on the outer peripheral surface of the conductive support 30 via the conductive adhesive layer 33.

Elastic Material: Rubber Material Having Halogen Group

A rubber material having a halogen group is used as an elastic material for the elastic layer 31 from the viewpoint of improving adhesive properties and adhesiveness maintaining properties between the elastic layer and the conductive adhesive layer.

Examples of the halogen group include F, Cl, Br, I, and At and among these, rubber containing Cl, F, or Br atom is preferably used. Rubber containing a chlorine atom is more preferably used.

Examples of the rubber material having a halogen group include epichlorohydrin rubber, epichlorohydrin-ethyleneoxide copolymer rubber, and epichlorohydrin-ethyleneoxide-allylglycidylether copolymer rubber.

Among these, epichlorohydrin-ethyleneoxide-allylglycidylether copolymer rubber is still more preferable.

In addition, the rubber materials having a halogen group may be used singly or in combination of two or more types.

Other Elastic Materials

Further, other elastic materials may be used together with the rubber material having a halogen group in the elastic layer. Examples of the elastic materials to be used together include isoprene rubber, chloroprene rubber, epichlorohydrin rubber, butyl rubber, polyurethane, silicone rubber, fluorine rubber, styrene-butadiene rubber, butadiene rubber, nitrile rubber, ethylene-propylene rubber, ethylene-propylene-diene ternary copolymer rubber (EPDM), acrylonitrile-butadiene copolymer rubber (NBR), natural rubber, and blended rubber thereof. These elastic materials may be foamed or non-foamed.

However, when other elastic materials are used together with the rubber material having a halogen group as the elastic material, the ratio of the rubber material having a halogen group to a total elastic material is preferably 50% by weight or more, more preferably 70% by weight or more, and still more preferably 100% by weight.

Conductive Material

Examples of the conductive material include an electron conductive material and an ion conductive material. Examples of the electron conductive material include powders of carbon black such as ketjen black and acetylene black; pyrolytic carbon, graphite; various conductive metals or alloys such as aluminum, copper, nickel, and stainless steel; various conductive metal oxides such as tin oxide, indium oxide, titanium dioxide, tin oxide-antimony oxide solid solution, and tin oxide-indium oxide solid solution; and insulating materials of which the surface is processed to be conductive. Examples of the ion conductive material include perchlorates and chlorates of tetraethyl ammonium and lauryl trimethyl ammonium; perchlorates and chlorates of alkali metal such as lithium and magnesium, and alkali earth metal.

These conductive materials may be used singly or in a combination of two or more types.

Here, specific examples of the carbon black include "SPECIAL BLACK 350", "SPECIAL BLACK 100", "SPECIAL BLACK 250", "SPECIAL BLACK 5", "SPECIAL BLACK 4", "SPECIAL BLACK 4A", "SPECIAL BLACK 550", "SPECIAL BLACK 6", "COLOR BLACK FW200", "COLOR BLACK FW2", and "COLOR BLACK FW2V" of which all are produced by Evonik Industries AG and "MONARCH 1000", "MONARCH 1300", "MONARCH 1400", "MOGUL-L", and "REGAL 400R" of which all are made by Cabot Corporation.

The average particle size of the conductive material is preferably from 1 nm to 200 nm.

The average particle size is calculated by observing a sample obtained by cutting from the elastic layer 31 with an electron microscope, measuring the diameters (the maximum diameters) of 100 conductive material particles, and averaging the measured diameters.

The amount of the conductive material to be added is not particularly limited. However, in the case of the electron conductive material, the amount of the conductive material is preferably in the range of 1 part by weight to 30 parts by weight with respect to 100 parts by weight of the elastic material and more preferably in the range of 15 parts by weight to 25 parts by weight. In the case of the ion conductive material, the amount of the conductive material is preferably in the range of 0.1 part by weight to 5.0 parts by weight with respect to 100 parts by weight of the elastic material and more preferably in the range of 0.5 part by weight to 3.0 parts by weight.

Other Additives

Examples of the other additives to be blended to the elastic layer 31 include materials which may be typically added to an elastic layer, such as a softener, a plasticizer, a curing agent, a vulcanizing agent, a vulcanizing accelerator, an antioxidant, a surfactant, a coupling agent, and a filler (such as silica and calcium carbonate).

Formation of Elastic Layer

The elastic layer 31 is not particularly limited but, for example, an elastic layer forming material is extruded with the conductive support 30 on which the conductive adhesive layer 33 is formed by the use of an extrusion molding machine including a cross head to form the elastic layer on the outer peripheral surface of the conductive adhesive layer.

After the elastic layer forming material is provided, it is preferable that heating be performed at a temperature at which the crosslinking reaction of the halogen group crosslinking agent occurs to form the elastic layer. In addition, the elastic layer is further formed on the adhesive layer that is formed when heating is not performed at a temperature at which the crosslinking reaction by the halogen group crosslinking agent may occur, and heating is performed at a temperature at which the crosslinking reaction of the elastic layer and the adhesive layer with the halogen group crosslinking agent may occur. Thus, the crosslinking reaction by the halogen group crosslinking agent occurs more effectively at the interface between the elastic layer and the adhesive layer. Therefore, adhesive properties may be improved.

Here, the method of forming the elastic layer by the use of an extrusion molding machine including a cross head will be described using the drawing.

Figure 3:
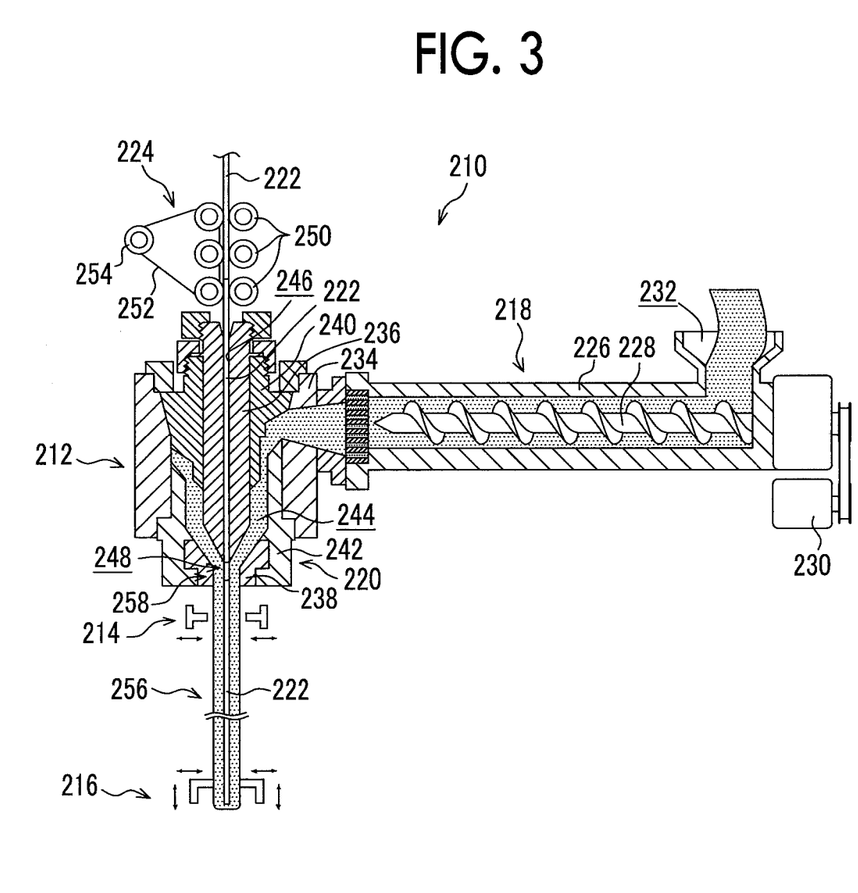
FIG. 3 is a diagram schematically illustrating an extrusion molding machine having a cross head.

FIG. 3 illustrates the configuration of a rubber roll manufacturing apparatus (an extrusion molding machine including the cross head) 210 used to form an elastic layer in the exemplary embodiment.

The rubber roll manufacturing apparatus 210 according to the exemplary embodiment includes a discharger 212 including a so-called cross head die, a pressurizer 214 arranged below the discharger 212, and a puller 216 arranged below the pressurizer 214.

The discharger 212 includes a rubber material feeding unit 218 feeding an unvulcanized rubber material (the material of the elastic layer 31), an extrusion unit 220 extruding the rubber material fed from the rubber material feeding unit 218 in a cylindrical shape, and a core feeding unit 224 feeding a core 222 (the conductive support 30 on which the conductive adhesive layer is formed) to the central part of the rubber material extruded in a cylindrical shape from the extrusion unit 220.

The rubber material feeding unit 218 includes a screw 228 in a cylindrical body 226. The screw 228 is rotationally driven by a drive motor 230. An input port 232 to which the rubber material is input is arranged on the side of the drive motor 230 of the body 226. The rubber material input to the input port 232 is sent to the extrusion unit 220 while being kneaded by the screw 228 in the body 226. By adjusting the rotation speed of the screw 228, the speed at which the rubber material is sent may be adjusted.

The extrusion unit 220 includes a cylindrical case 234 connected to the rubber material feeding unit 218, a columnar mandrel 236 arranged at the center in the case 234, and a discharge head 238 arranged below the mandrel 236. The mandrel 236 is held in the case 234 by a holding member 240. The discharge head 238 is held in the case 234 by a holding member 242. An annular flow channel 244 in which the rubber material flows in a ring shape is formed between the outer peripheral surface (the outer peripheral surface of the holding member 240 in a part) of the mandrel 236 and the inner peripheral surface (the inner peripheral surface of the discharge head 238 in a part) of the holding member 242.

An insertion hole 246 through which the core 222 passes is formed at the center of the mandrel 236. The lower portion of the mandrel 236 is tapered to the end thereof. The region below the tip end of the mandrel 236 is a joint region 248 in which the core 222 fed from the insertion hole 246 and the rubber material fed from the annular flow channel 244 join. That is, the rubber material is extruded in a cylindrical shape toward the joint region 248 and the core 222 is sent to the central part of the rubber material extruded in a cylindrical shape.

The core feeding unit 224 includes pairs of rollers 250 arranged above the mandrel 236. Plural (three) pairs of rollers 250 are provided, and one roller of each pair of rollers 250 is connected to a driving roller 254 through a belt 252. When the driving roller 254 is driven, the core 222 pinched by each of the pairs of rollers 250 is sent to the insertion hole 246 of the mandrel 236. The core 222 has a predetermined length, and plural cores 222 sequentially pass through the insertion hole 246 by causing a following core 222 sent by the pairs of rollers 250 to extrude a preceding core 222 present in the insertion hole 246 of the mandrel 236. The driving of the driving roller 254 is temporarily stopped when the front end of the preceding core 222 is located at the tip end of the mandrel 236, and the cores 222 are sent with an interval in the joint region 248 below the mandrel 236.

In this manner, in the discharger 212, the rubber material is extruded in a cylindrical shape in the joint region 248 and the cores 222 are sequentially sent with an interval to the central part of the rubber material. Accordingly, the outer peripheral surface of the core 222 is coated with the rubber material, and a rubber roll portion 256 (that is, the above-described elastic layer) is formed on the outer peripheral surface of the core 222 (the conductive support 30 on which the conductive adhesive layer is formed).

The thickness of the elastic layer 31 is preferably from 1 mm to 10 mm, and more preferably from 2 mm to 5 mm.

The volume resistivity of the elastic layer 31 is preferably from $10^3$ Ωcm to $10^{14}$ Ωcm.

Conductive Outermost Layer

A polymeric material of the conductive outermost layer 32 is not particularly limited. Examples thereof include polyamide, polyurethane, polyvinylidene fluoride, tetrafluoroethylene copolymer, polyester, polyimide, silicone resin, acrylic resin, polyvinyl buryral, ethylene tetrafluoroethylene copolymer, melamine resin, fluorine rubber, epoxy resin, polycarbonate, polyvinyl alcohol, cellulose, polyvinylidene chloride, polyvinyl chloride, polyethylene, and ethylene-vinyl acetate copolymer.

These polymeric materials may be used singly or in mixture or co-polymerization of two or more types. The number average molecular weight of the polymeric materials is preferably in a range of 1,000 to 100,000 and more preferably in a range of 10,000 to 50,000.

The conductive outermost layer 32 may be formed of a composition obtained by mixing the conductive materials used for the elastic layer 31 or various particles described below as a conductive material with the polymeric materials. The amount thereof to be added is not particularly limited, but is preferably in a range of 1 part by weight to 50 parts by weight with respect to 100 parts by weight of the polymeric material and more preferably in a range of 5 parts by weight to 20 parts by weight.

As the particles, metal oxides and complex metal oxides such as silicon oxide, aluminum oxide, and barium titanate and polymer powders such as tetrafluoroethylene and vinylidene fluoride may be used singly or in mixture, but the particles are not limited to these examples.

The thickness of the conductive outermost layer 32 is preferably thick in consideration of durability against abrasion of the charging member, but the thickness is preferably in a range of 0.01 μm to 1000 μm, more preferably in a range of 0.1 μm to 500 μm, and still more preferably in a range of 0.5 μm to 100 μm.

The conductive outermost layer 32 may be formed on the conductive elastic layer using a dipping method, a spray method, a vacuum deposition method, a plasma coating method, or the like. The dipping method among these methods may be preferably used from the viewpoint of manufacturing processes.

A method of manufacturing a charging member according to an exemplary embodiment includes applying a conductive adhesive containing a crosslinking agent having two or more functional groups reacting with a halogen group and a resin having a halogen group on a conductive support at a temperature at which crosslinking reaction of the crosslinking agent does not occur to form a conductive adhesive layer; and providing an elastic material containing a rubber material having a halogen group so as to contact with the conductive adhesive layer and performing heating at a temperature at which crosslinking reaction of the crosslinking agent occurs to form an elastic layer.

Charging Device

Hereinafter, a charging device according to an exemplary embodiment will be described.

Figure 4:
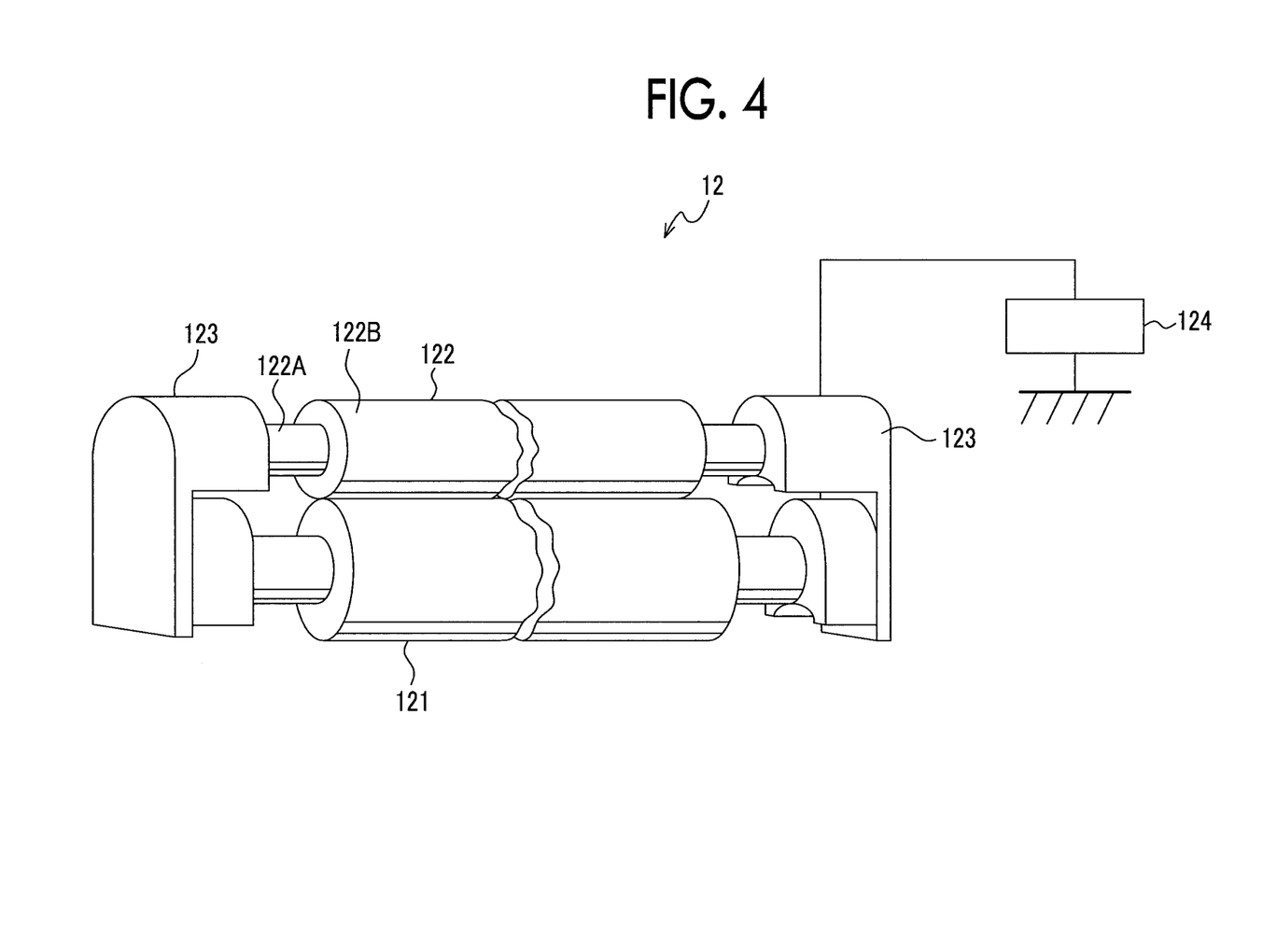
FIG. 4 is a perspective view schematically illustrating a charging device according to an exemplary embodiment.

FIG. 4 is a perspective view schematically illustrating the charging device according to the exemplary embodiment.

In the charging device according to the exemplary embodiment, the charging member according to the exemplary embodiment is used as a charging member.

Specifically, in the charging device 12 according to the exemplary embodiment, for example, a charging member 121 and a cleaning member 122 are arranged so as to contact with each other with a specific amount of inroad, as shown in FIG. 4. Both ends in the axis direction of a conductive support 30 of the charging member 121 and a conductive support 122A of the cleaning member 122 are held by conductive bearings 123 (conductive bearings) so that the members are freely rotatable. A power source 124 is connected to one of the conductive bearings 123.

The charging device according to the exemplary embodiment is not limited to the above-mentioned configuration and, for example, the cleaning member 122 may not be provided.

The cleaning member 122 is a cleaning member for cleaning the surface of the charging member 121 and is formed, for example, in a roll shape. The cleaning member 122 includes, for example, a conductive support 122A having a cylindrical or columnar shape and an elastic layer 122B on the outer peripheral surface of the conductive support 122A.

The conductive support 122A is a rod-like conductive member. Examples of the material of the conductive support member include metals such as iron (such as free-cutting steel), copper, brass, stainless steel, aluminum, and nickel. Members (such as resin or ceramic members) of which the outer peripheral surface is plated or members (such as resin or ceramic members) in which a conductive material is dispersed may be used as the conductive support 122A. The conductive support 122A may be a hollow member (tubular member) or a non-hollow member.

The elastic layer 122B is formed of a foam having a three-dimensional porous structure, has voids or unevenness (hereinafter, referred to as cells) in or on the surface thereof, and may have elasticity, preferably. The elastic layer 122B includes foamed resin materials or rubber materials such as polyurethane, polyethylene, polyamide, olefin, melamine or polypropylene, acrylonitrile-butadiene copolymer rubber (NBR), ethylene-propylene-diene copolymer rubber (EPDM), natural rubber, styrene-butadiene rubber, chloroprene, silicone, and nitrile.

Among the foamed resin materials and rubber materials, polyurethane resistant to tearing and tensile strength may be particularly suitably used so as to efficiently clean foreign substances such as toner or external additives by the frictional slide over the charging member 121, to make it difficult for the surface of the charging member 121 to be damaged due to the friction with the cleaning member 122, and to make it difficult to disconnect or break the elastic layer for a long period of time.

The polyurethane is not particularly limited, and examples thereof include reactants of polyols (such as polyester polyol, polyether polyol, and acrylpolyol) and isocyanates (such as 2,4-tolylene diisocyanate, 2,6-tolylene diisocyanate, 4,4-diphenylmethane diisocyanate, tolidine diisocyanate, and 1,6-hexamethylene diisocyanate) and reactants based on chain extenders (such as 1,4-butanediol and trimethylolpropane). The polyurethane is typically foamed using a foaming agent (such as water or azo compounds (such as azodicarbonamide and azobisisobutyronitrile)).

The number of cells in the elastic layer 122B is preferably from 20/25 mm to 80/25 mm, more preferably from 30/25 mm to 80/25 mm, and still more preferably from 30/25 mm to 50/25 mm.

The hardness of the elastic layer 122B is preferably from 100 N to 500 N, more preferably from 100 N to 400 N, and particularly preferably in the range of 150 N to 400 N.

The conductive bearings 123 are members holding the charging member 121 and the cleaning member 122 so as to be freely integrally rotatable and maintaining the inter-shaft distance therebetween. The conductive bearings 123 may have any material and shape, as long as the bearings are formed of a conductive material. Examples thereof include a conductive bearing or a conductive sliding bearing.

The power source 124 is a device that applies a voltage to the conductive bearings 123 to charge the charging member 121 and the cleaning member 122 to the same polarity and a known high-voltage power source device is used.

In the charging device 12 according to this exemplary embodiment, the charging member 121 and the cleaning member 122 are charged to the same polarity, for example, by applying a voltage to the conductive bearings 123 from the power source 124.

Image Forming Apparatus and Process Cartridge

An image forming apparatus according to an exemplary embodiment includes an image holding member, a charging unit that charges the image holding member, a latent image forming unit that forms a latent image on the surface of a charged image holding member, a developing unit that develops the latent image formed on the surface of the image holding member with toner to form a toner image, and a transfer unit that transfers the toner image formed on the surface of the image holding member to a recording medium. The above-mentioned charging device according to this exemplary embodiment is used as the charging unit (charging device).

On the other hand, a process cartridge according to the exemplary embodiment is detachable from, for example, the image forming apparatus having the above-mentioned configuration and includes an image holding member and a charging unit that charges the image holding member. The above-mentioned charging device according to the exemplary embodiment is used as the charging unit. The process cartridge according to this exemplary embodiment may include at least one selected from the group consisting of a developing unit that develops a latent image formed on the surface of the image holding member with toner to form a toner image, a transfer unit that transfers the toner image formed on the surface of the image holding member to a recording medium, and a cleaning unit that removes the toner remaining on the surface of the image holding member after the transfer, if necessary.

Figure 5:
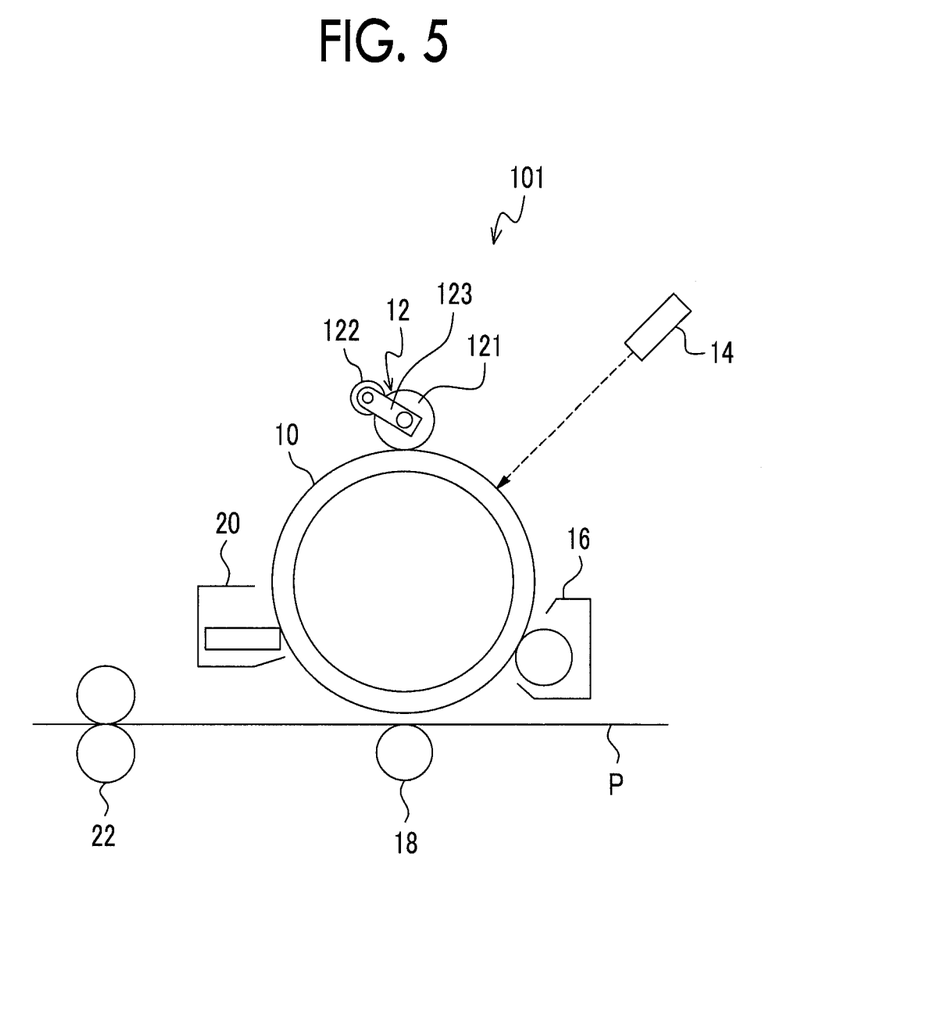
FIG. 5 is a diagram schematically illustrating the configuration of an image forming apparatus according to an exemplary embodiment.
Figure 6:
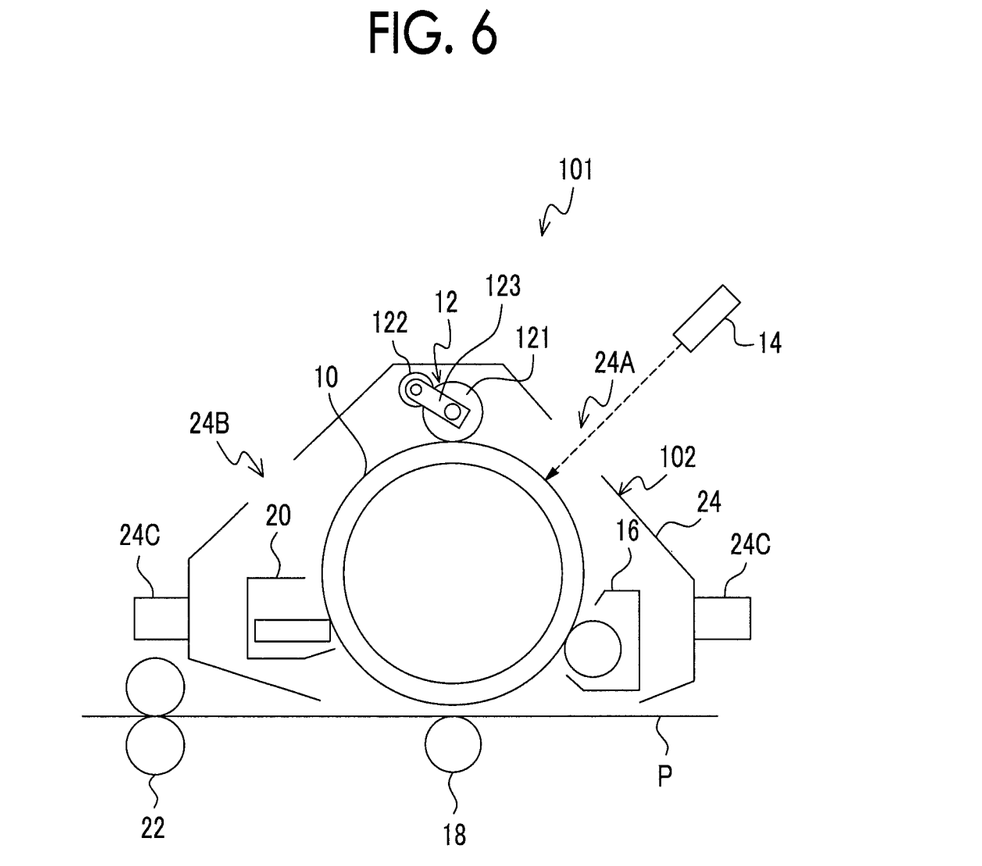
FIG. 6 is diagram schematically illustrating the configuration of a process cartridge according to an exemplary embodiment.

Next, the image forming apparatus and the process cartridge according to the exemplary embodiment will be described below with reference to the drawings. FIG. 5 is a diagram schematically illustrating the configuration of the image forming apparatus according to the exemplary embodiment. FIG. 6 is a diagram schematically illustrating the configuration of the process cartridge according to the exemplary embodiment.

As shown in FIG. 5, the image forming apparatus 101 according to this exemplary embodiment includes an image holding member 10 and further includes a charging device 12 charging the image holding member 10, an exposing device 14 exposing the image holding member 10 charged by the charging device 12 to form a latent image, a developing device 16 developing the latent image formed by the exposing device 14 with toner to form a toner image, a transfer device 18 transferring the toner image formed by the developing device 16 to a recording medium P, and a cleaning device 20 removing the toner remaining on the surface of the image holding member 10 after transfer, around the image holding member 10. The image forming apparatus 101 further includes a fixing device 22 fixing the toner image transferred to the recording medium P by the transfer device 18.

The image forming apparatus 101 according to the exemplary embodiment employs as the charging device 12 the charging device according to the exemplary embodiment that is provided with the charging member 121, the cleaning member 122 arranged to contact with the charging member 121, the conductive bearings 123 (conductive bearings) holding both ends in the axis direction of the charging member 121 and the cleaning member 122 so as to be independently rotatable, and the power source 124 connected to one of the conductive bearings 123.

On the other hand, the image forming apparatus 101 according to this exemplary embodiment employs known constituent elements of the electrophotographic image forming apparatus of the related art as constituent elements other than the charging device 12 (the charging member 121). An example of each constituent element will be described below.

The image holding member 10 employs a known photoreceptor without any particular limitation, and a so-called functional separation type organic photoreceptor in which a charge generating layer and a charge transporting layer are divided is suitably used. The image holding member 10 of which the surface layer is coated with a protective layer having a charge transporting function and a crosslinking structure is also suitably used. The photoreceptor, in which the crosslinking component of the protective layer is a siloxane-based resin, a phenol-based resin, a melamine resin, a guanamine resin, or an acrylic resin, is also suitably used.

For example, a laser optical system or an LED array is used as the exposing device 14.

For example, the developing device 16 is a developing device that allows a developer holding member having a developer layer formed on the surface thereof to come in contact with or to get close to the image holding member 10 and attaches the toner to the latent image on the surface of the image holding member 10 to form a toner image. The developing method of the developing device 16 suitably employs a known developing method using a two-component developer. Examples of the developing method using the two-component developer include a cascade method and a magnetic brush method.

For example, the transfer device 18 may employ any of a non-contact-type transfer method such as a corotron and a contact-type transfer method of bringing a conductive transfer roll into contact with the image holding member 10 with a recording medium P interposed therebetween and transferring the toner image to the recording medium P.

For example, the cleaning device 20 is a member which brings, for example, a cleaning blade into direct contact with the surface of the image holding member 10 to remove the toner, the paper powder, and the dust attached to the surface. As the cleaning device 20, a cleaning brush, a cleaning roll, or the like may be used instead of the cleaning blade.

A heating fixing device using a heating roll is suitably used as the fixing device 22. The heating fixing device includes a fixing roller having a heater lamp for heating inside a cylindrical core and a so-called release layer formed on the outer peripheral surface thereof out of a heat-resistant resin coating layer or a heat-resistant rubber coating layer and a pressing roller or a pressing belt disposed in contact with the fixing roller with a specific contact pressure and having a heat-resistant elastic layer on the outer peripheral surface of a cylindrical core or the surface of a belt-like conductive support. For example, a process of fixing a non-fixed toner image is performed by causing the recording medium P on which a non-fixed toner image is transferred to pass between the fixing roller and the pressing roller or the pressing belt and fixing the toner image by thermally melting a binder resin, additives, and the like in the toner.

The image forming apparatus 101 according to the exemplary embodiment is not limited to the above-mentioned configuration and may be an intermediate transfer type image forming apparatus employing an intermediate transfer member or a so-called tandem type image forming apparatus in which image forming units forming toner images of different colors are arranged in parallel.

On the other hand, as shown in FIG. 6, the process cartridge according to the exemplary embodiment is a process cartridge 102 in which the image holding member 10, the charging device 12 charging the image holding member, the developing device 16 developing the latent image formed by the exposing device 14 with toner to form a toner image, and the cleaning device 20 removing the toner remaining on the surface of the image holding member 10 after transfer are integrally combined, held, and constructed by a housing 24 including an opening 24A for exposure, an opening 24B for erasing exposure, and an attachment rail 24C in the image forming apparatus shown in FIG. 5. The process cartridge 102 is detachably attached to the image forming apparatus 101 shown in FIG. 5.

EXAMPLES

The present invention will be described in detail based on examples, but the present invention is not limited to the following examples. Unless otherwise mentioned, "part" means "part by weight".

Example 1

Preparation of Charging Roll

Preparation of Rubber Composition

A mixture of the composition described below is kneaded using a tangential type pressure kneader (manufactured by MORIYAMA COMPANY LTD.: actual capacity 55 L) and the kneaded product is passed through a strainer to prepare a rubber composition to prepare a charging roll.

Specifically, the temperatures of a jacket, a pressure lid and a rotor of the pressure kneader are set to 20° C. by using circulating water, and the rubber material described below is masticated under 0.6 MPa pressure of the pressure lid, and zinc oxide is kneaded, and then, stearic acid and carbon black are added and kneaded, and the ion conductive material and calcium carbonate are added and kneaded. The kneaded product is cut in a sheet shape using a biaxial sheet preforming machine (manufactured by MORIYAMA COMPANY LTD.: actual capacity 75 L), and cooled to room temperature (25° C.). Then, a crosslinking agent and a vulcanizing accelerator are added thereto and the resultant is kneaded again by the pressure kneader and passes through a strainer with a gear pump extruder to obtain a rubber composition.

Composition of Elastic Layer

| | |
|---|---|
| Rubber material having halogen group (epichlorohydrin-ethyleneoxide-allylglycidylether copolymer rubber, trade name: CG102, manufactured by Daiso Co., Ltd.) | 100 parts |
| Zinc oxide (trade name: ZINC OXIDE TYPE 2, manufactured by Seido Chemical Industry Co., Ltd.) | 5 parts |
| Stearic acid (trade name: STEARIC ACID S, manufactured by Kao Corporation) | 1 part |
| Carbon black (trade name: KETJEN BLACK EC, manufactured by Lion Corporation) | 15 parts |
| Calcium carbonate (trade name: WHITE CALCIUM CARBONATE CCR, manufactured by SHIRAISHI KOGYO Kaisha, Ltd.) | 20 parts |
| Ion conductive material (benzyltrimethylammonium chloride, trade name: BTMAC, manufactured by LION AKZO CO., LTD.) | 1 part |
| Crosslinking agent (trade name: SULFUR 200 MESH, manufactured by TSURUMI CHEMICAL INDUSTRY CO., LTD.) | 1 part |
| Vulcanizing accelerator (trade name: NOCCELER DM, manufactured by OUCHI SHINKO CHEMICAL INDUSTRIAL CO, LTD.) | 2 parts |
| Vulcanizing accelerator (trade name: NOCCELER TT, manufactured by OUCHI SHINKO CHEMICAL INDUSTRIAL CO, LTD.) | 0.5 part |

Formation of Adhesive Layer

The mixture of the composition described below is dispersed with a bead mill to prepare a dispersion. A conductive support made of SUS 303 having a diameter of 8 mm and a length of 330 mm is coated with the obtained dispersion by a dip coating method, and then, dried at 150° C. for 10 minutes to remove the solvent. Thus, an adhesive layer having a thickness of 15 μm is obtained.

Composition of Adhesive Layer

| | |
|---|---|
| Resin material having halogen group (chlorosulfonated polyethylene, trade name: CN1500, manufactured by TOSOH CORPORATION) | 100 parts |
| Conductive material (carbon black, trade name: KETJEN BLACK EC600JD, manufactured by Lion Corporation) | 40 parts |
| Solvent (xylene, manufactured by Kanto Chemical Industry Co., Ltd.) | 640 parts |
| Acid acceptor (magnesium oxide, trade name: KYOWA MAG 150, manufactured by Kyowa Chemical Industry Co., Ltd.), | 5.0 parts |
| Crosslinking agent having two or more functional groups reacting with halogen group (6-methylquinoxaline-2,3-dithiocarbonate, trade name: XL21S, manufactured by Daiso Co., Ltd.) | 1.5 parts |
| Accelerator (1,8-diazabicyclo(5.4.0)undec-7-ene, trade name: DBU, manufactured by San-Apro Ltd.) | 1.0 part |

Formation of Elastic Layer

A conductive support on which the adhesive layer is formed is prepared and the rubber composition is extruded at a screw rotation rate of 25 rpm using a monoaxial rubber extruder in which the inner diameter of a cylinder is 60 mm and L/D=20 (L represents a length (mm) of the screw of the monoaxial rubber extruder, D represents a diameter (mm) of the screw of the monoaxial rubber extruder), and the conductive support is allowed to pass continuously through a cross head to coat the rubber composition on the conductive support. As the temperature condition of the extruder, all of the cylinder portion, screw portion, head portion and die portion are set to 80° C. An unvulcanized rubber roll formed of the conductive support and the coated rubber composition is vulcanized in an air heating furnace at 160° C. for 60 minutes.

Formation of Surface Layer

The mixture of the composition described below is dispersed with a bead mill to prepare a dispersion. The obtained dispersion is diluted with methanol and thus, a surface layer coating solution is obtained. Methanol and butanol are used to adjust the viscosity of the surface layer coating solution to be 45 mPa·s. Then, the surface layer coating solution is poured into a dip coating bath.

Then, the conductive support on which the adhesive layer and elastic layer are formed is dipped in the coating solution in the dip coating bath, and is pulled out. The conductive support is dried at 150° C. for 10 minutes and a solvent is removed. As a result, a surface layer is formed. In this manner, a charging roll, which includes the adhesive layer, the elastic layer, and the surface layer in this order on the conductive support, is obtained.

Composition of Dispersion

| | |
|---|---|
| Polymeric material (amide resin, trade name: AMILAN CM8000, manufactured by TORAY INDUSTRIES INC.) | 100 parts |
| Conductive material (carbon black, trade name: MONARCH 1000, manufactured by Cabot Corporation) | 14 parts |
| Solvent (methanol, manufactured by Kanto Chemical Industry Co., Ltd.) | 500 parts |
| Solvent (butanol, manufactured by Kanto Chemical Industry Co., Ltd.) | 240 parts |

Example 2

A charging member is obtained in the same manner as in Example 1, except that the blending amount of the crosslinking agent having two or more functional groups reacting with a halogen group in Example 1 is changed to 0.01 part.

Example 3

A charging member is obtained in the same manner as in Example 1, except that the blending amount of the crosslinking agent having two or more functional groups reacting with a halogen group in Example 1 is changed to 10 parts.

Example 4

A charging member is obtained in the same manner as in Example 1, except that the crosslinking agent having two or more functional groups reacting with a halogen group in Example is changed to a triazine compound (2,4,6-trimercapto-s-triazine, trade name: ZISNET F, manufactured by SANKYO KASEI Co., Ltd.).

Example 5

A charging member is obtained in the same manner as in Example 1, except that the blending amount of the crosslinking agent having two or more functional groups reacting with a halogen group in Example 4 is changed to 0.01 part.

Example 6

A charging member is obtained in the same manner as in Example 1, except that the blending amount of the crosslinking agent having two or more functional groups reacting with a halogen group in Example 4 is changed to 10 parts.

Example 7

A charging member is obtained in the same manner as in Example 1, except that the crosslinking agent having two or more functional groups reacting with a halogen group in Example 1 is changed to a thiourea compound (trimethylthiourea, trade name: NOCCELER TMU, manufactured by OUCHI SHINKO CHEMICAL INDUSTRIAL CO, LTD.).

Example 8

A charging member is obtained in the same manner as in Example 1, except that the blending amount of the crosslinking agent having two or more functional groups reacting with a halogen group in Example 7 is changed to 0.01 part.

Example 9

A charging member is obtained in the same manner as in Example 1, except that the blending amount of the crosslinking agent having two or more functional groups reacting with a halogen group in Example 7 is changed to 10 parts.

Example 10

A charging member is obtained in the same manner as in Example 1, except that the crosslinking agent having two or more functional groups reacting with a halogen group in Example 1 is changed to a polyamine compound (hexamethylenediamine carbamate, trade name: CHEMINOX AC-6, manufactured by Unimatec Co., Ltd.).

Example 11

A charging member is obtained in the same manner as in Example 1, except that the crosslinking agent having two or more functional groups reacting with a halogen group in Example is changed to a liquid bisphenol AF type epoxy resin (bisphenol AF, trade name: ZX1059, manufactured by Tohto Kasei Co., Ltd.).

Example 12

A charging member is obtained in the same manner as in Example 1, except that the resin material having a halogen group in the adhesive layer in Example 1 is changed to chloroprene (chloroprene, trade name: SHOWPRENE WHV, manufactured by Showa Denko K.K.).

Example 13

A charging member is obtained in the same manner as in Example 4, except that the resin material having a halogen group in the adhesive layer in Example 4 is changed to chloroprene (chloroprene, trade name: SHOWPRENE WHV, manufactured by Showa Denko K.K.).

Example 14

A charging member is obtained in the same manner as in Example 7, except that the resin material having a halogen group in the adhesive layer in Example 7 is changed to chloroprene (chloroprene, trade name: SHOWPRENE WHV, manufactured by Showa Denko K.K.).

Example 15

A charging member is obtained in the same manner as in Example 10, except that the resin material having a halogen group in the adhesive layer in Example 10 is changed to chloroprene (chloroprene, trade name: SHOWPRENE WHV, manufactured by Showa Denko K.K.).

Example 16

A charging member is obtained in the same manner as in Example 11, except that the resin material having a halogen group in the adhesive layer in Example 11 is changed to chloroprene (chloroprene, trade name: SHOWPRENE WHV, manufactured by Showa Denko K.K.).

Example 17

A charging member is obtained in the same manner as in Example 1, except that the resin material having a halogen group in the adhesive layer in Example 1 is changed to halogenated polyolefin (chlorinated polyolefin, trade name: 390S, manufactured by NIPPON PAPER Chemicals CO., LTD.).

Example 18

A charging member is obtained in the same manner as in Example 1, except that the resin material having a halogen group in the adhesive layer in Example 1 is changed to a fluorinated resin (tetrafluoroethylene-propylene copolymer, trade name: AFLAS 150L, manufactured by JSR Corporation).

Example 19

A charging member is obtained in the same manner as in Example 1, except that the resin material having a halogen group in the adhesive layer in Example 1 is changed to chlorinated butyl (chlorinated butyl, trade name: CHLOROBUTYL 1066, manufactured by JSR Corporation).

Example 20

A charging member is obtained in the same manner as in Example 1, except that the resin material having a halogen group in the adhesive layer in Example 1 is changed to brominated butyl (brominated butyl, trade name: BROMOBUTYL 2244, manufactured by JSR Corporation).

Comparative Example 1

A charging member is obtained in the same manner as in Example 1, except that the crosslinking agent having two or more functional groups reacting with a halogen group in Example 1 is not used.

Comparative Example 2

A charging member is obtained in the same manner as in Example 1, except that the rubber material having a halogen group in the elastic layer in Example 1 is changed to a non-halogen rubber material (EPDM, ESPRENE 505A, manufactured by Sumitomo Chemical Company, Ltd.).

Comparative Example 3

A charging member is obtained in the same manner as in Example 1, except that the resin having a halogen group in the adhesive layer in Example 1 is changed to a non-halogen resin (polyester resin, LP033, manufactured by The Nippon Synthetic Chemical Industry Co., Ltd.).

Evaluation of Adhesive Properties

A peeling test is performed by gripping the end portion of the elastic layer of each charging member with a chuck and pulling the end in a 90-degree direction in the environment of a temperature 23±3° C. and a humidity of 50±5% according to JIS K 6854-1 (1999) to evaluate adhesive properties.

Evaluation Criteria

A: Damage occurs on the elastic layer at 100% of the total area.

B: Peeling occurs at the interface between the elastic layer and the adhesive layer at 30% or less of the total area.

C: Peeling occurs at the interface between the elastic layer and the adhesive layer at more than 30% and 70% or less of the total area.

D: Peeling occurs at the interface between the elastic layer and the adhesive layer at more than 70% of the total area.

In addition, when the peeling test is performed, the peeling strength (unit: N) is measured. The results are shown in Table 1.

Actual Machine Evaluation

The charging members prepared by the above-described methods in Examples and Comparative examples are respectively mounted on a color copying machine, DocuCentre Color 400CP, manufactured by Fuji Xerox Co., Ltd., as a charging roll, and a print test with 50,000 sheets of A4 is performed (25,000 sheets are printed in the environment of 10° C. and 15% RH, and then, 25,000 sheets are printed in the environment of 28° C. and 85% RH) using color toners (cyan, magenta, yellow, and black toners) for the color copying machine, DocuCentre Color 400CP.

The image quality in the initial image and the image formed after 50,000 sheets are printed is determined by the following criteria through visual observation based on whether or not density unevenness is present in the halftone image. The density unevenness in the initial image is described as density unevenness caused by total runout in Table 1 and the density unevenness in the image after 50,000 sheets are printed is described as time-dependent density unevenness caused by filming in Table 1.

A: Defects such as density unevenness do not occur.

B: Density unevenness very slightly occurs.

C: Density unevenness slightly occurs

D: Density unevenness that makes the actual use impossible occurs.

TABLE 1

|  | Evaluation of adhesive properties | Peeling strength (unit: N) | Image quality evaluation | |
| --- | --- | --- | --- | --- |
|  |  |  | Initial image | Image formed after 50,000 sheets are printed |
| Example 1 | A | 103 | A | A |
| Example 2 | B | 72 | A | B |
| Example 3 | A | 102 | A | A |
| Example 4 | A | 115 | A | A |
| Example 5 | B | 80 | A | B |
| Example 6 | A | 111 | A | A |
| Example 7 | A | 92 | A | A |
| Example 8 | B | 63 | A | B |
| Example 9 | A | 95 | A | A |
| Example 10 | A | 56 | A | A |
| Example 11 | A | 52 | A | A |
| Example 12 | A | 108 | A | A |
| Example 13 | A | 113 | A | A |
| Example 14 | A | 93 | A | A |
| Example 15 | A | 65 | A | A |
| Example 16 | A | 55 | A | A |
| Example 17 | A | 105 | A | A |
| Example 18 | A | 101 | A | A |
| Example 19 | A | 107 | A | A |
| Example 20 | A | 106 | A | A |
| Comparative example 1 | D | 7 | C | D |
| Comparative example 2 | D | 4 | C | D |
| Comparative example 3 | D | 2 | C | D |

The foregoing description of the exemplary embodiments of the present invention has been provided for the purposes of illustration and description. It is not intended to be exhaustive or to limit the invention to the precise forms disclosed. Obviously, many modifications and variations will be apparent to practitioners skilled in the art. The embodiments were chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. A charging member comprising:
a conductive support;
a conductive adhesive layer that is arranged on the conductive support and contains a crosslinking agent having two or more functional groups reacting with a halogen group and a resin having a halogen group; and
an elastic layer that is arranged so as to contact with the conductive adhesive layer and contains a rubber material having a halogen group,
wherein the resin having a halogen group in the conductive adhesive layer and the rubber material having a halogen group in the elastic layer are cross-linked by reaction with the crosslinking agent at least at an interface between the conductive adhesive layer and the elastic layer.

2. The charging member according to claim 1,
wherein the crosslinking agent is at least one selected from the group consisting of a triazine compound, a quinoxaline compound, and a thiourea compound.

3. The charging member according to claim 1,
wherein an amount of the crosslinking agent to be blended is from 0.005 part by weight to 15 parts by weight with respect to 100 parts by weight of the resin having a halogen group.

4. The charging member according to claim 1,
wherein an amount of the crosslinking agent to be blended is from 0.05 part by weight to 10 parts by weight with respect to 100 parts by weight of the resin having a halogen group.

5. The charging member according to claim 1,
wherein the resin having a halogen group is a resin containing Cl, F or Br atom.

6. The charging member according to claim 1,
wherein the resin having a halogen group is at least one selected from chlorosulfonated polyethylene, polychloroprene, halogenated polyolefin, fluororesin, chlorinated butyl, and brominated butyl.

7. A charging device comprising the charging member according to claim 1.

8. A process cartridge comprising:
an image holding member; and
a charging device that includes the charging member according to claim 1 and charges the image holding member,
wherein the process cartridge is detachable from an image forming apparatus.

9. An image forming apparatus comprising:
an image holding member;
a charging device that includes the charging member according to claim 1 and charges the image holding member,
a latent image forming device that forms a latent image on a surface of a charged image holding member;
a developing device that develops the latent image formed on the surface of the image holding member with toner to form a toner image; and
a transfer device that transfers the toner image formed on the surface of the image holding member to a recording medium.

10. A method of manufacturing a charging member comprising:
applying a conductive adhesive containing a crosslinking agent having two or more functional groups reacting with a halogen group and a resin having a halogen group on a conductive support at a temperature at which crosslinking reaction of the crosslinking agent does not occur to form a conductive adhesive layer; and
providing an elastic material containing a rubber material having a halogen group so as to contact with the conductive adhesive layer and performing heating at a temperature at which crosslinking reaction of the crosslinking agent occurs to form an elastic layer.

* * * * *